Nov. 16, 1954 M. F. WARD 2,694,426
PLATE AND SPIDER ASSEMBLY FOR MATERIAL GRINDING MACHINES
Filed Oct. 23, 1951 3 Sheets—Sheet 2
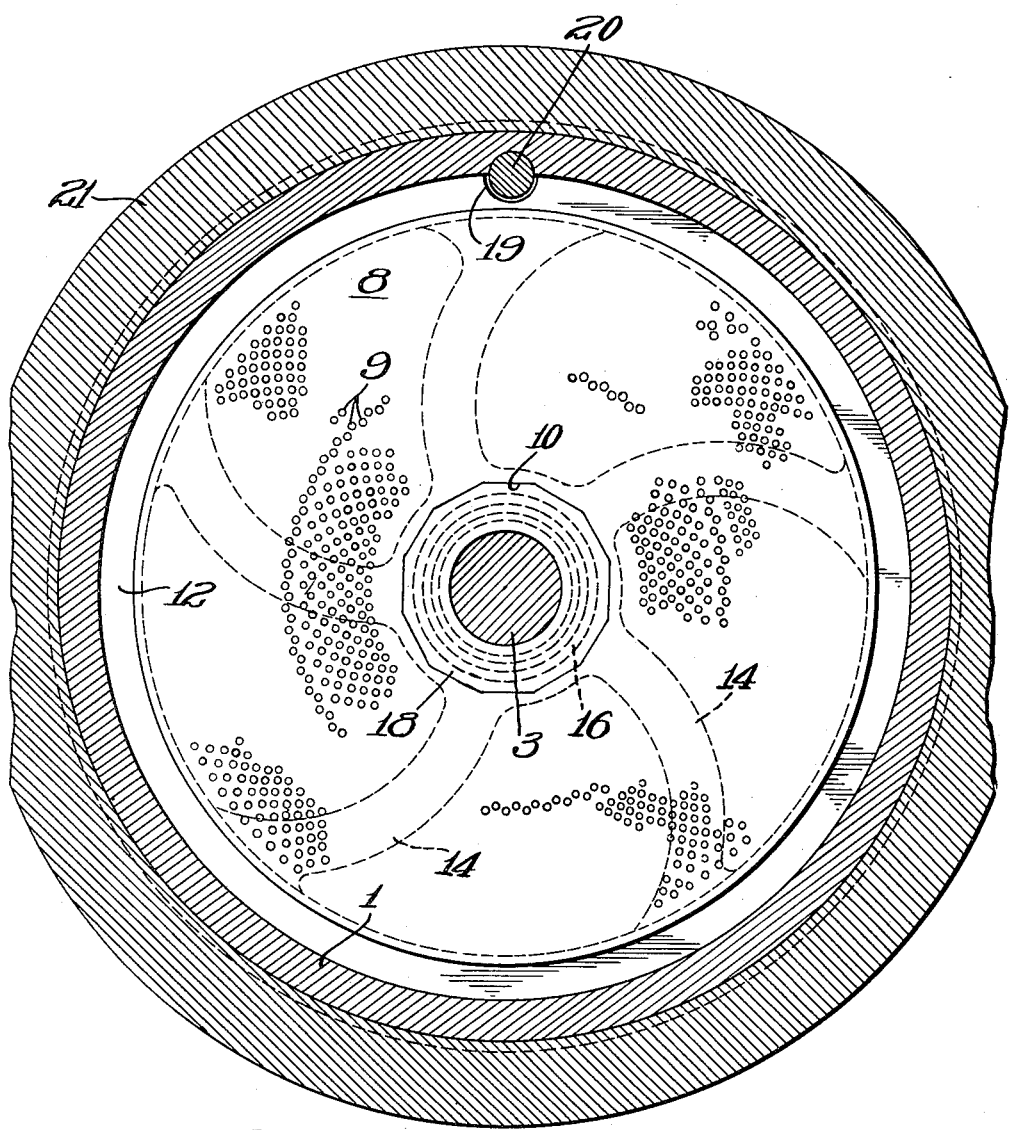
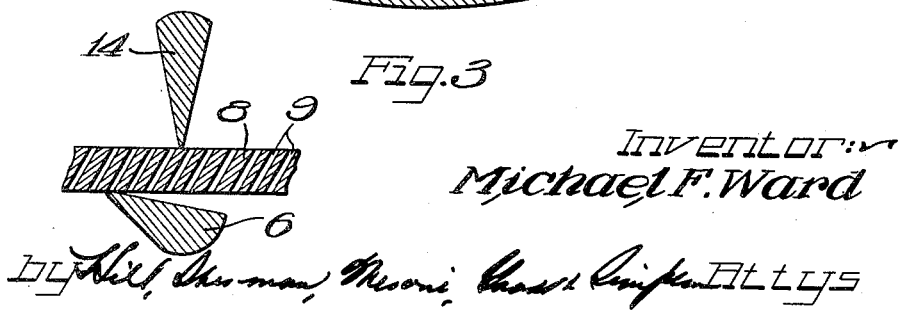
Inventor:
Michael F. Ward Nov. 16, 1954   M. F. WARD   2,694,426
PLATE AND SPIDER ASSEMBLY FOR MATERIAL GRINDING MACHINES
Filed Oct. 23, 1951   3 Sheets-Sheet 3
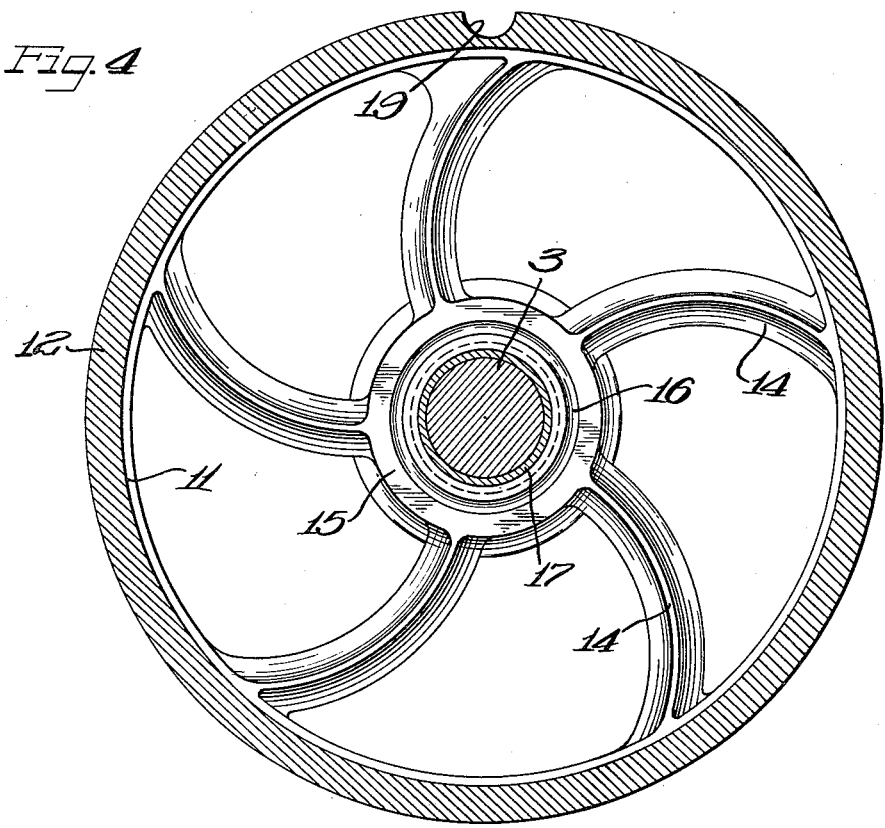
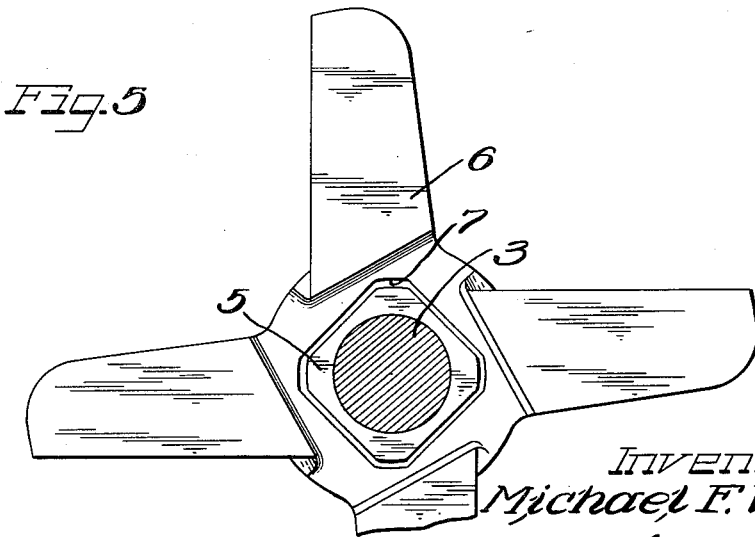
Inventor:
Michael F. Ward
by Attys United States Patent Office 2,694,426
Patented Nov. 16, 1954

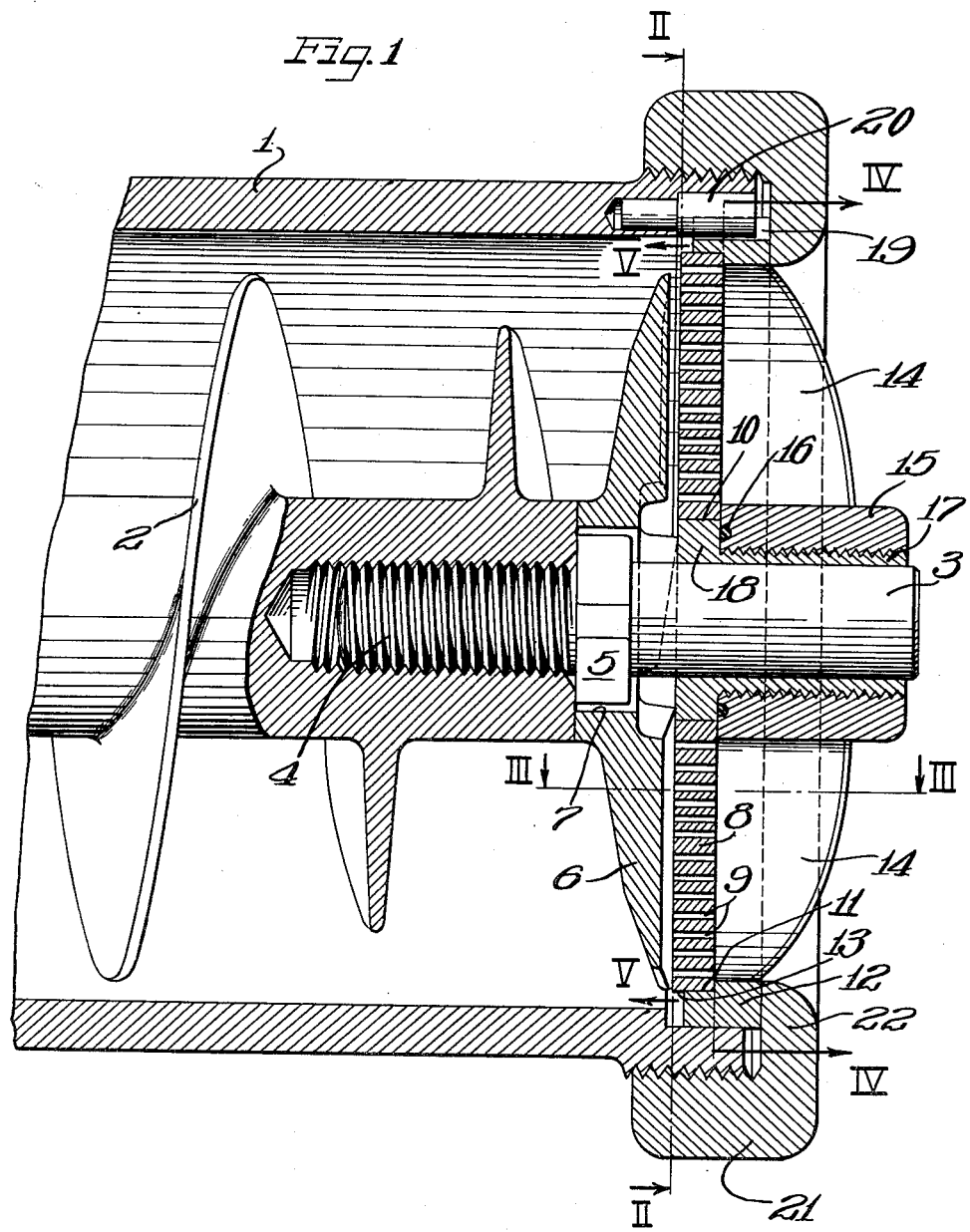

2,694,426

PLATE AND SPIDER ASSEMBLY FOR MATERIAL GRINDING MACHINES

Michael F. Ward, Chicago, Ill., assignor to The Cincinnati Butchers' Supply Company, Cincinnati, Ohio, a corporation of Ohio Application October 23, 1951, Serial No. 252,665

1 Claim. (Cl. 146—189)

This invention relates to improvements in a plate assembly for material grinding machines, and more particularly to a retaining spider and plate assembly for grinding machines of the character highly desirable for use in meat packing plants and the like to grind meat in forms for use as sausage, hamburger steak, and the like, although the invention is equally adaptable for grinding nuts, other food items, washing powder, soap chips, and materials of various types, as will be apparent to one skilled in the art.

The instant application is an improvement of my co-pending application entitled "Retaining Spider and Plate for a Material Grinding Machine," filed May 24, 1949, Serial No. 94,976, now Patent Number 2,624,384, issued January 16, 1954.

Material grinding machines of the character with which the instant invention is associated, usually involve a cylinder, in which a rotary helical feed screw is turned to move the material forwardly against a plate having a myriad of apertures therein and over the inner surface of which a multi-bladed knife is also rotated. It is necessary to journal the forward portion of the feed screw shaft, and especially where food products are ground, no lubricant as such for the shaft journal can be used because it would contaminate the food product. It is substantially impossible to maintain that lubricant around the shaft journal and not let any escape, and sanitary laws prohibit the use of lubricant. Consequently, a machine depending upon lubricant at that point for its successful operation is useless since its use is prohibited.

The plates themselves owing to the numerous apertures therein are highly expensive, the cost of the plate increasing proportionately with the decrease in the size of the apertures. Breakage of these plates has long been an objectionable item of expense. This cannot be overcome by making the plates thicker, because the thicker the plate, the longer the path through the apertures and consequently the more difficult it is to force the material through the plate apertures. With a thick plate, in the case of meat, instead of getting clean cut "worms" of meat through the plate, only tallow-like mush frequently results. It is important therefore to utilize a thin plate, but that thin plate must be protected against the tremendous pressure developed inside a high capacity machine.

With the foregoing in mind, it is an important object of the instant invention to provide a plate assembly for material grinding machines embodying an exceptionally thin plate which cuts clean, even with holes as little as one-sixteenth inch in diameter and the ground product comes through clean in an excellent condition by virtue of the short distance it has to travel through the plate.

Also an object of this invention is the provision of a plate assembly for grinding machines, the assembly being so constructed that the only load to which the plate is subjected is a compression load, and the plate does not carry the thrust load developed in the machine, nor the bearing load for the feed screw shaft.

A further object of the invention resides in the provision of a plate and spider assembly, the spider being constructed to take all the thrust load developed in the machine, and provide a bearing for the feed screw shaft.

Another feature of the invention resides in the provision of a plate assembly for grinding machines, wherein the diameter of the plate may be increased as desired, without requiring a proportionate increase or any increase in the thickness of the plate.

It is also a feature of the invention to provide a plate assembly for a grinding machine, wherein the plate is so constructed and so mounted as to never need regrinding or refinishing.

A further object of the invention resides in the provision of a plate assembly for grinding machines, the assembly providing a bearing for the feed screw shaft, so arranged that the juices from the product being ground provides adequate lubrication at that bearing.

Still another object of the invention resides in the provision of a plate for grinding machines, wherein the holes may be of any desired diameter from one-sixteenth inch upward, and wherein the holes extend through the plate on the slant, so that the plate is always maintained in a sharpened condition at the edges of the holes throughout its life.

It is also a feature of the invention to provide a plate assembly for a grinding machine in which the plate is merely slipped into position, and in which the entire assembly may be readily and easily dismantled, for cleansing or other purposes, and as easily assembled the entire structure requiring very little time and attention to keep it in a sanitary condition and maintain it.

While some of the more salient features, characteristics and advantages of the instant invention have been above pointed out, others will become apparent from the following disclosures, taken in conjunction with the accompanying drawings, in which—

Figure 1 is a fragmentary central vertical sectional view, with parts shown in elevation, of a grinding machine equipped with a plate assembly embodying principles of the instant invention;

Figure 2 is a fragmentary transverse vertical sectional view taken substantially as indicated by the line II—II of Fig. 1, looking in the direction of the arrows;

Figure 3 is a fragmentary plan sectional view taken substantially as indicated by the line III—III of Fig. 1;

Figure 4 is also a transverse vertical sectional view taken substantially as indicated by the line IV—IV of Fig. 1; and Figure 5 is a transverse vertical sectional view in the opposite direction taken substantially as indicated by the line V—V of Fig. 1, fragmentary in character, and showing the cutting knife in elevation.

As shown on the drawings:

The illustrated embodiment of the instant invention is shown in operative association with a material grinding machine of the high capacity type as utilized especially in meat packing plants. All parts of the structure embodied in the instant invention are preferably made of stainless steel, for sanitary purposes, although other materials plated or finished to a satisfactory extent, might also be used.

The grinding machine itself embodies a cylinder 1 into which material to be ground is introduced through an opening not illustrated. Inside the cylinder is a power driven feed screw 2. The forward end of this feed screw has a stub shaft 3 threadedly engaged therein as indicated at 4, and this stub shaft carries an abutment formation in the nature of a polygonal head 5. Slipped over the polygonal head 5 is a multi-bladed knife 6, the knife having four blades in the illustrated showing, and this knife is held in place by virtue of its contact with the plate to be later described. As seen best in Fig. 1, the knife blade preferably slopes toward the cutting edge so that contact with the plate renders the knife what may be termed self-sharpening. As seen best in Fig. 5, the cutting edges of the knife are preferably disposed on the same side of each blade.

The knife 6 is provided with a polygonal central opening 7 complemental to the polygonal head on the stub shaft so that rotation of the shaft will cause corresponding rotation of the knife.

Forward of the knife 6 is the cutting plate 8 provided with numerous apertures 9 therethrough. While these aperteures are illustrated as running straight through the plate in Fig. 1, for purposes of clarity, the apertures preferably run on the slant as seen best in Fig. 3; and while only a portion of the apertures are illustrated in Fig. 2, they are spread over substantially the entire working surface of the plate. With the apertures on the slant as illustrated in Fig. 3, it will be noted that the edges of the apertures will be maintained sharp throughout constant use, since the action of the knife 6 against the face of the plate tends to maintain both the edges of the apertures and the knife blade sharp throughout the life of the plate.

The plate itself is preferably substantially a true disk, having a cylindrical outer rim and being provided with a polygonal central opening 10 for mounting purposes. This plate may be made very thin, and need not exceed a thickness of three-eighths inch, in comparison with the customary commercial seven-eighths inch thick plate. Consequently, even with apertures of one-sixteenth inch diameter, the material being ground readily passes through the plate and exists therefrom in a highly satisfactory condition. It will also be noted that with a plate as thin as the instant one, pressure inside the cylinder 1 is not built up to near the extent it would be with a thick plate. Further, cleansing of the plate after use is an extremely simple matter compared with the cleansing of a thick plate, since with the plate 8 material lodging in the apertures 9 may be readily blown or washed out, and it is not necessary to force an instrument individually through most of the apertures as has been the case with plates used heretofore.

The plate slips into a notched portion 11 or groove in the rim of an adaptor ring or spider 12 as seen in Figs. 1 and 4, and as seen best in Fig. 1, the plate projects inwardly beyond the rim of the spider 12 as indicated at 13, so that the inner face and a part of the outer cylindrical surface of the plate is exposed inside the cylinder 1 for contact by the knife 6. As seen clearly in the lower portion of Fig. 1, the blades of the knife extend to the outer edge of the plate so that in effect the knife is of the same diameter as the plate, and therefore cannot groove the plate in operation. Accordingly, it is substantially never necessary to refinish either face of the plate during its life, and it makes no difference which face of the plate is against the knife. During assembly, the operator need pay no attention whatever as to which face of the plate confronts the knife.

As seen best in Fig. 4, the adaptor ring or spider 12 includes a plurality of inwardly extending spokes 14, and these spokes are preferably curvate in character. As noted from the showing in Fig. 3, the spokes are inwardly tapered so as to provide a narrow edge contact with the plate and thus avoid occluding or blocking all but a minute portion of the apertures in the plate.

At the center of the spider the spokes connect with an integral hub 15 having a threaded aperture therethrough. The inside face of the hub is provided with an annular groove to accommodate a relatively soft annular gasket 16 seen in Figs. 1 and 4, and which may be satisfactorily made of synthetic rubber or the like which will not be adversely affected by juices from the material being ground. Threadedly engaged inside the hub 15 is a bearing bushing 17 having a flanged head 18 of polygonal character complemental to the opening 10 in the plate. This polygonal head 18 is preferably of substantially the same thickness as the plate, and the outer smooth face of the bushing abuts the aforesaid gasket 16 so as to provide an effective seal and prevent juices from the material being ground from entering between the threads of the bushing and the hub. Such arrangement is highly important, because it has been found that juices, especially from meat, will enter any such substantially permanent connection and require daily dismantling of the entire structure in order to prevent the development of bacteria and objectionable odors.

The bushing 17 functions as a bearing for the stub shaft 3 of the feed screw. It will therefore be especially noted that the spider by virtue of the spokes 14, and its engagement with the outer rim of the plate at the notch 11, and the hub and bushing assembly 15 and 17, carry substantially the entire load developed by the grinding machine. The bearing load is carried by the spider, and all the thrust load developed inside the machine is also carried by the spider, so that the plate is effectively relieved of all this load and the likelihood of breakage of the plate is reduced to a minimum.

No added lubrication of any kind is necessary or desired, the juices from the material being ground providing adequate lubrication between the stub shaft 3 and the bearing bushing 17.

One item of special significance in connection with the instant invention resides in the fact that if it is desired to increase the capacity of the machine, and a larger cylinder 1 provided, the plate 8 may be made of a larger diameter without requiring an increase in thickness of the plate, by virtue of the fact that the load is removed from the plate and carried by the spider.

A notch 19 is provided in the rim of the spider to accommodate a set screw 20 engaged in a suitable opening in the cylinder 1 so as to prevent rotation of the spider. The spider is held in proper position by a retaining ring 21 threadedly engaged around the outer end of the cylinder 1, and having an inwardly extending flange 22 to abut the outer face of the spider rim.

It is a very simple expedient, therefore, to remove the retainer ring 21, withdraw the spider and plate off the stub shaft 3, slip the plate off the head 18 of the spider bushing, and slip the knife off the polygonal head 5 carried by the stub shaft. Thus, the parts are all separated for easy and ready cleansing, it not being necessary to remove the bushing 17 from the spider because of the gasket 16. In reassembling the structure, the knife may be readily slipped into position, the plate merely slipped into the notch in the spider, the spider and plate together pushed over the stub shaft 3, and the retaining ring 21 screwed into place. When this arrangement is considered along with the fact that the knife and plate are self-sharpening, the plate does not need regrinding or refinishing during its life, and there are no securing elements to be connected with the exception of the retaining ring 21, the tremendous economy of maintenance of the instant invention is at once apparent. From the foregoing, it is apparent that I have provided a highly efficient, economical, long lived, and readily serviced plate assembly for grinding machines of various character. It will, of course, be understood that a number of plates having holes of different diameter may be used with the same spider.

It will be understood that modifications and variations may be effected without departing from the scope of the novel concepts of the present invention.

I claim as my invention:

A plate and spider assembly for a material grinding machine, including a plate in the form of a disk having numerous relatively small openings therein, a spider including an annular rim, spokes and a hub assembly, a polygonal head on the inner end of said hub assembly, said spider having an annular notch of less depth than the thickness of said plate in the rim thereof for the reception of said plate with a part of the edge and one face of the plate protruding, and said plate having a polygonal opening slidable over said head which engagement forms the sole means to prevent relative rotation between the plate and spider.

References Cited in the file of this patent

UNITED STATES PATENTS

| Number | Name | Date |
|---|---|---|
| 649,770 | Snow | May 15, 1900 |
| 1,078,949 | Pavelka | Nov. 18, 1913 |
| 1,084,854 | Ganzham | Jan. 20, 1914 |
| 1,439,312 | Johnson | Dec. 19, 1922 |
| 1,451,891 | Rataiczak | Apr. 17, 1923 |
| 1,695,898 | Laemmel | Dec. 18, 1928 |
| 1,825,475 | Pfeiffer | Sept. 29, 1931 |
| 2,037,823 | Royle | Apr. 21, 1936 |
| 2,220,729 | Powers | Nov. 5, 1940 |
| 2,561,920 | Fried et al. | July 24, 1951 |
| 2,583,600 | Schreiber | Jan. 29, 1952 |

FOREIGN PATENTS

| Number | Country | Date |
|---|---|---|
| 484,514 | Germany | Oct. 3, 1929 |